United States Patent [19]

Finley et al.

[11] Patent Number: 5,060,227
[45] Date of Patent: Oct. 22, 1991

[54] DIGITAL TELEPHONE SWITCH WITH SIMULTANEOUS DUAL PCM FORMAT COMPATIBILITY

[75] Inventors: Roger W. Finley, Barrington; Barry D. Lubin, Schaumburg; Bruce A. Bergendahl, Lake Zurich, all of Ill.

[73] Assignee: Motorola, Inc., Schaumburg, Ill.

[21] Appl. No.: 385,842

[22] Filed: Jul. 26, 1989

Related U.S. Application Data

[63] Continuation of Ser. No. 161,883, Feb. 29, 1988, abandoned.

[51] Int. Cl.$^5$ .............................................. H04J 3/02
[52] U.S. Cl. ...................................... 370/79; 370/84; 370/58.1
[58] Field of Search ...................... 370/58.1, 79, 84, 99

[56] References Cited

U.S. PATENT DOCUMENTS

| | | | |
|---|---|---|---|
| 4,093,827 | 6/1978 | Charransol et al. | 370/59 |
| 4,268,722 | 5/1981 | Little et al. | 370/62 |
| 4,510,597 | 4/1985 | Lewis | 370/66 |
| 4,563,767 | 1/1986 | Brandt | 375/107 |
| 4,575,841 | 3/1986 | Fagerstedt et al. | 370/14 |
| 4,615,028 | 9/1986 | Lewis et al. | 370/58 |
| 4,616,360 | 10/1986 | Lewis | 370/67 |
| 4,639,909 | 1/1987 | Nirschl et al. | 370/58.1 |
| 4,658,397 | 4/1987 | Kawamura et al. | 370/58.1 |
| 4,660,194 | 4/1987 | Larson et al. | 370/15 |
| 4,661,966 | 4/1987 | Schriener | 375/112 |
| 4,685,102 | 8/1987 | Lewis | 370/15 |
| 4,686,668 | 8/1987 | Koseki et al. | 370/15 |
| 4,688,208 | 8/1987 | Kawaguchi | 370/15 |
| 4,688,209 | 8/1987 | Banzi, Jr. et al. | 370/15 |
| 4,763,317 | 8/1988 | Lehman et al. | 370/58.1 |
| 4,797,654 | 1/1989 | Young et al. | 341/50 |
| 4,885,739 | 12/1989 | Read et al. | 370/58.1 |

OTHER PUBLICATIONS

Boyle et al., "Transmission/Switching Interfaces and Toll Terminal Equipment", Bell System Technical Journal, vol. 56, No. 7, Sep. 1977, pp. 1057–1097.
Moridera et al., "FETEX Digital Switching System for Central Office", IEEE-ICC 1978 Conf. Record, pp. 37.2.1–37.2.5.
Joel, Jr., "Digital Switching-How It Has Developed", Electronic Switching: Digital Central Office Systems of the World, IEEE Press, 1982, pp. 1–12.
Delta Communications, "T1 to CEPT Converter", Sales Brochure, 1986.
"Mitel Semiconductor, Microelectronic Products Data Book Issue 3", pp. 5-261 to 5-275; 5-233 to 5-236; and 5-199 to 5-211; Nov. 1986.
Siemens, "Telecommunications Data Book 1987", pp. 5-13 and 5-16, 1987.
American Telephone & Telegraph, "Digital Channel Bank Requirements and Objectives", Nov. 1982, pp. 1-2 and A1–A11.
Sueyoshi et al., "A Versatile Digital Switching System for Central Office NEAX 61", Int. Switching Symp. Conf. Rec., May 7-11, 1979, pp. 82–90.

Primary Examiner—Douglas W. Olms
Assistant Examiner—Min Jung
Attorney, Agent, or Firm—Raymond A. Jenski; Rolland R. Hackbart

[57] ABSTRACT

A PCM telephone switch that is simultaneously compatible with both DS-1 and CEPT PCM formats is disclosed. A switch module performs timeslot switching of individual subchannels between DS-1 and CEPT trunks which are input by way of digital group interfaces. Each group interface couples to one or more trunks of serial bit streams of either DS-1 or CEPT format standards. After the input serial bit stream is converted to a parallel format, it is used as eight bits of the address bits of data processing ROMs from which a corresponding 8-bit word is parallel read on a per channel basis and routed to the appropriate output data processing ROMs. The output data bits of the ROMs are the processed data bits which are reconverted to serial format for either DS-1 or CEPT standards as required by the output trunk. A-law or μ-law decoding and encoding is accomplished independently from input to output channel on a per channel basis.

8 Claims, 3 Drawing Sheets

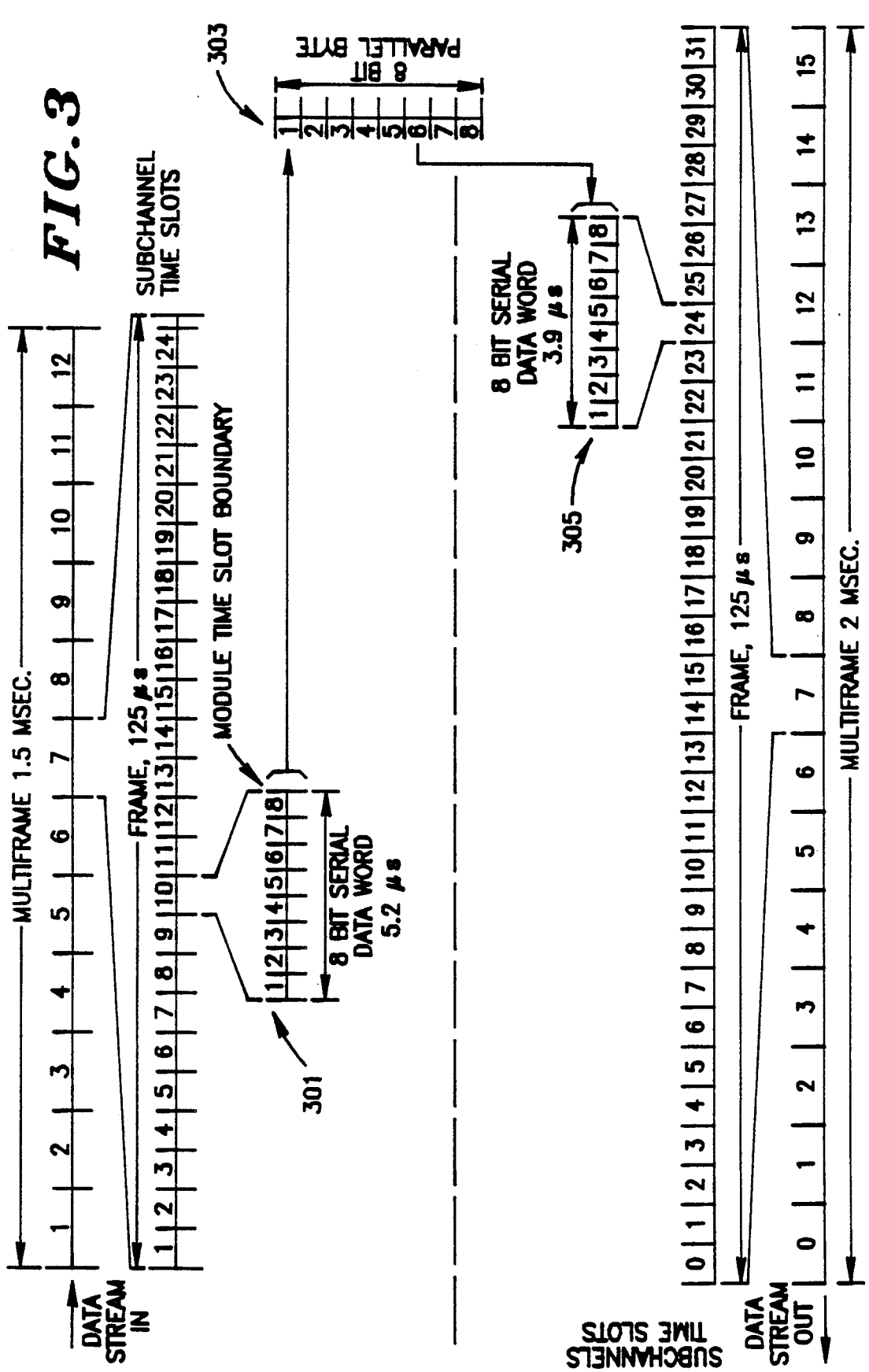

DIGITAL TELEPHONE SWITCH WITH SIMULTANEOUS DUAL PCM FORMAT COMPATIBILITY

This is a continuation of application Ser. No. 161,883 filed on Feb. 29, 1968 now abandoned.

BACKGROUND OF THE INVENTION

This invention relates generally to digital telephone exchanges and more particularly to a digital telephone exchange which simultaneously interfaces with telephone networks having various PCM circuits of differing bit rates and protocols and provides compatible connections between them. This invention is related to the invention described in U.S. Pat. No. 4,860,281, "Individual Subchannel Loopback in the PCM Interfaces of a Digital Telephone Exchange With Control of the Outbound Path" filed on behalf of Finley et al.

Many digital exchanges interface the central network through which calls are routed (commonly called the switch) to the outside world, all or in part, via Time-Division-Multiplexed (TDM) Pulse Code Modulated (PCM) four-wire circuits which can carry 24 or 30 or more subchannels. These circuits are often called "PCM groups." Each subchannel is allocated specific bit positions for speech or data and for channel associated line signaling for either trunk use or subscriber line use or for unrelated use. Where the trunks employ common channel signaling, the line signaling bit positions may be used for that purpose of signalling, or even go unused as might also be the case in certain data and audio applications.

PCM got an earlier start in North America than in Europe and has evolved based primarily on a 24 subchannel first level multiplexer, transmitted at 1.544 Mbps, with several speech coding formats, line signal formats and transmission formats. Today, the analog speech is all coded into digital representations using an algorithm known as µ-Law. In the 24 channel formats known as DS-1 and the Extended Superframe Format (ESF) in general use today, line signaling generally shares speech-bit positions but formats are still evolving, and other 1.544 Mbps formats with separated speech and signaling will ultimately replace DS-1 and ESF. Higher level multiplexers combine multiples of DS-1/ESF groups into 48, 96, 672, 4032 and various other numbers of subchannels depending upon the application.

The rest of the world has generally followed CCITT format recommendations. Starting later, and learning from the North American DS-1 experience and utilizing later technology, the CCITT format calls for a first level multiplexer of 30 subchannels (commonly called CEPT-30 or simply CEPT) with independent line signaling fields and with A-Law speech coding, transmitted at 2.048 Mbps. Higher level multiplexers are mostly 4:1 concentrators, such as 120, 480 and 1920 subchannels. Notwithstanding the attempts at standardization, different telephone administrations employ different impedances, different transmission media (i.e., coaxial cable or twisted pairs), different transmission protocols, different line signaling conditions, different interfacing levels and so forth.

Most digital exchanges are designed to accommodate one basic first level multiplex PCM bitstream rate and protocol. Some can be adapted to interface either of several rates, but only in entirety. None are known to be able to accommodate odd protocol and data conversions on a per-subchannel basis. Thus, if by external applique one or more DS-1/ESF groups are converted to or from one or more CEPT groups, all (or maybe none) of the subchannel speech/data will undergo µ-Law/A-Law conversion (a simple table look-up) in a manner that is beyond control of the exchanges in tandem with a particular connection. There are complications in CEPT/CEPT and DS-1/ESF/CEPT line signal conversions which cross national boundaries, CCITT standards notwithstanding.

With the advent of the Integrated Services Digital Network (ISDN), it will be desirable, but sometimes frustratingly difficult to achieve end-to-end subchannel paths across national boundaries that are free of extraneous conversions. There is at least one category of exchanges known generally as Digital Access and Cross-Connect Systems (DACCS) in which it would be possible for the customer (subscriber) to impose the level of microcontrol required to achieve the desired end result.

SUMMARY OF THE INVENTION

Therefore it is one object of the present invention to provide the capability within one exchange to interface and properly interwork circuits of various protocols and speech/data coding.

It is another object of the present invention, on a subchannel-by-subchannel basis, to be able to compensate for format inconsistencies introduced elsewhere in a connection.

These and other objects are achieved in the present invention which encompasses a digital telephone switch which has simultaneous PCM format capability. A subchannel of a serial data bit stream of a first format is converted to a parallel data byte. This parallel data byte is switchably coupled to a converter which then converts the parallel data byte to a subchannel of a serial data bit stream of a second format.

BRIEF DESCRIPTION OF THE DRAWINGS

FIG. 3 is a timing diagram illustrating DS-1 and CEPT-30 data formats and the conversion employed in the present invention.

DESCRIPTION OF THE PREFERRED EMBODIMENT

Figure 1:
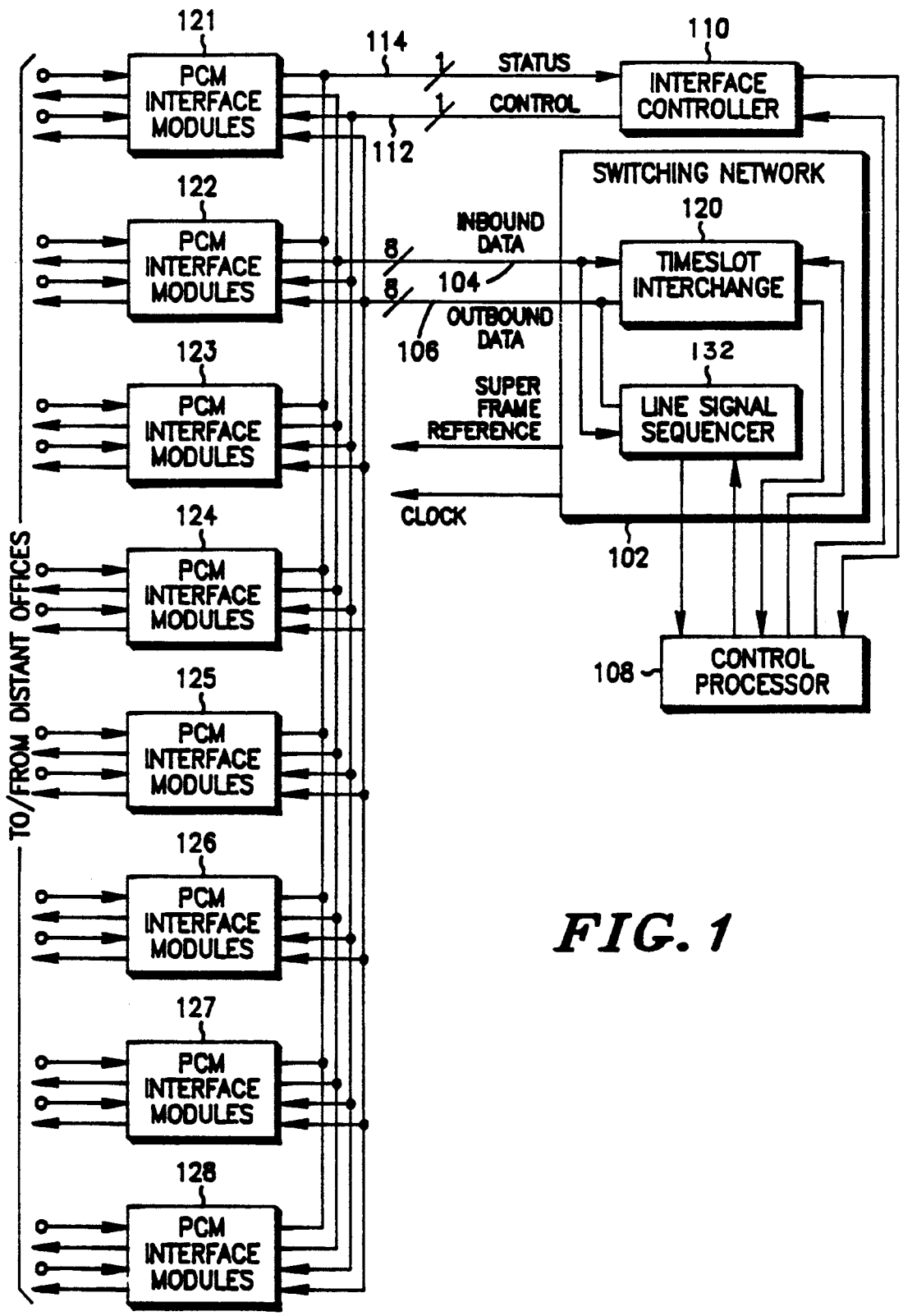
FIG. 1 is a block diagram of a small digital exchange which may employ the present invention.

In the preferred embodiment, a small exchange shown in FIG. 1 serves a maximum of eight interface modules, each of which interfaces two PCM circuits at either 1.544 Mbps or 2.048 Mbps. When serving a total of sixteen CEPT-30 circuits, the small exchange can accommodate a total of 480 subchannels. Synchronization is accomplished by the distribution of a 4.096 MHz clock and a 0.500 kHz superframe reference to the Switching Network 102 and the Interface Controller 110 (which may be module TRN9155C available from Motorola, Inc.), and all the Interface Modules 121–128. Speech and line signaling information between the Switching Network 102 and the Interface Modules 121–128 is carried on two 8-bit busses, Inbound Data 104 (inbound meaning from the Various interface modules toward the switching network 102) and Outbound Data 106 (outbound meaning from the switching network 102 to the various interface modules). These busses each carry 4.096 megabytes/second, apportioned into 512 bus-timeslots, a byte being allocated to each timeslot during each frame of 125 microseconds. Bus-timeslots are interleaved such that each interface module is assigned every eighth adjacent pair of bus-timeslots and each 24 or 30 subchannel PCM group interface (hereinafter referred to as "interface") is assigned one of this pair, or every sixteenth bus-timeslot. Thus, each interface is allocated 32 bus-timeslots per frame of 125 microseconds, these bus-timeslots being referred to in each respective interface as simply "timeslots," and being numbered 0 through 31. The format of each interface's timeslots on these busses is essentially that of CEPT-30 serial, but in 8-bit parallel form. There are 16 frames in a superframe, numbered, 0 through 15. Like CEPT format, during frames 1-15, each timeslot number 16 carries the four-bit channel associated line signals for a pair of subchannels, in the same respective positions as CEPT (subchannels 1 and 16 during frame 1, 2 and 17 during frame 2, etc.).

The exchange's Control Processor 108 interworks the Switching Network 102 in the following way:

1. Write instructions to the voice Time Slot Interchange (TSI) 120, thereby controlling the speech paths, and
2. Audit the path status of the TSI 120, and
3a. Write the data to be transmitted on any outbound signaling 4-bit word into the Line Signal Sequencer (LSS) 132, or
3b. Write a cross path instruction in 132 which will cause the 4-bit word to be derived directly from a specified incoming line signal word, and
5. Audit the path status of the LSS 132, and
6. Read the data of any of the 480 incoming signaling 4-bit words in the LSS 132 to detect changes as for call control processing.

Figure 2:
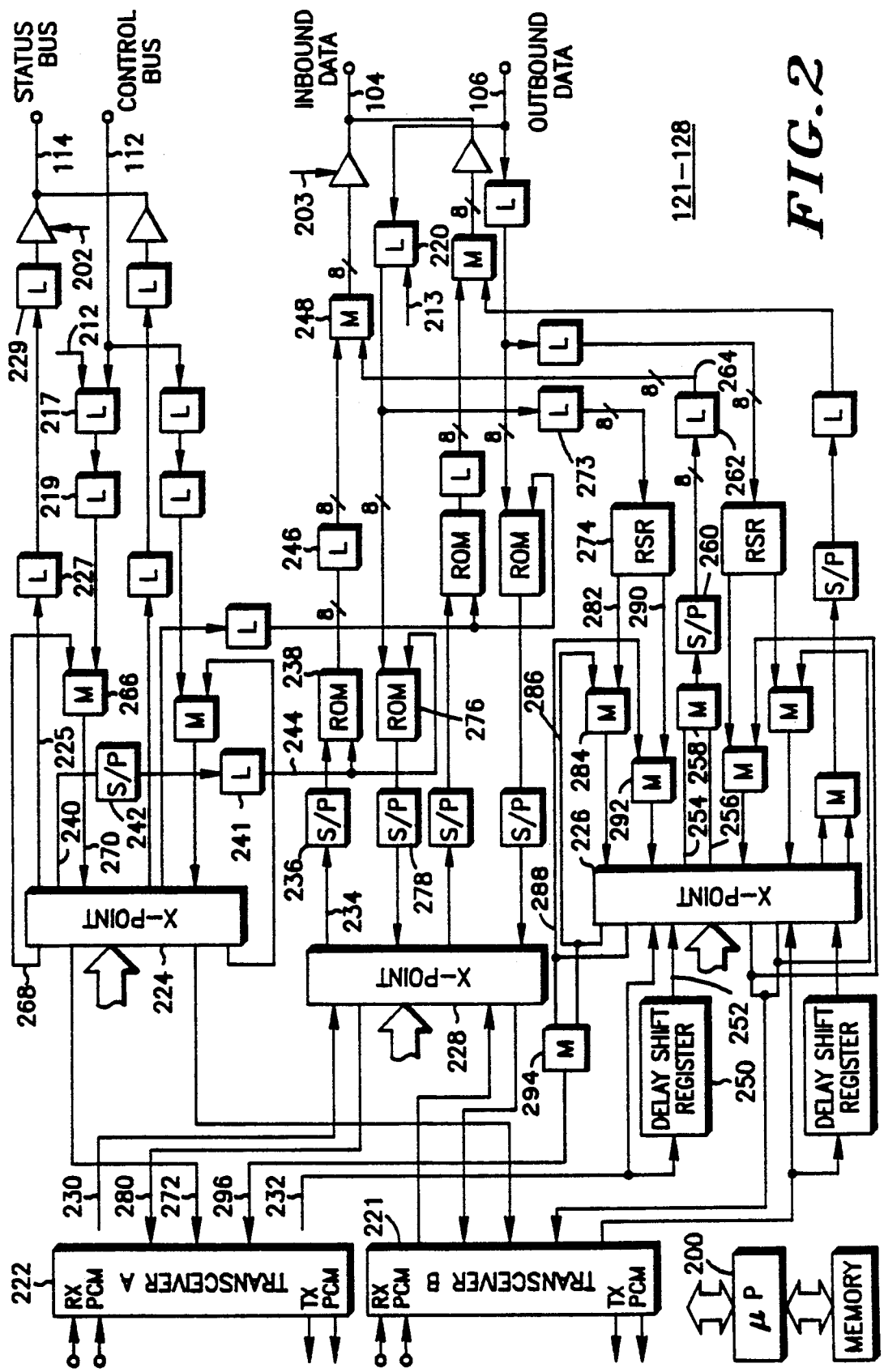
FIG. 2 is a block diagram of one of the PCM interface modules shown in FIG. 1 which may employ the present invention.

Each PCM Interface Module 121-128 contains two DS-1 or CEPT-30 interfaces. FIG. 2 shows the essential path routing within a module in block form. Complete interconnection of the microprocessor 200 (for example, an MC6809 microprocessor available from Motorola, Inc.) and the timing complexities have been omitted here in the interests of functional clarity but should be apparent to one of average skill in the art. The two PCM stream interfaces may be designated transceiver A and transceiver B, operating independently, except that in practice they share common bus connections, parts and microprocessor control, and that in certain other variations of this embodiment they are combined into a double-rate PCM interface. Each interface module determines its pair of 32 bus-timeslots by card edge decoding of prearranged edge connector connections to ground or supply voltage. The transceivers 221 and 222 may functionally be MH89760 or MH89780, manufactured by Mitel. In order to provide line to line switching within the interface module, a digital symmetrical matrix (cross-point switch, hereinafter "X-point") may be used. In the preferred embodiment, X-Points 224 and 226 may be MT8980 digital crosspoint switching integrated circuits manufactured by Mitel, and X-Point 228 may be a MT8981 digital crosspoint switching integrated circuit, also manufactured by Mitel. All the Mitel parts operate in frame synchronization. X-Points 224, 226 and 228 are interfaced to the microprocessor via a conventional I/O bus structure on which they operate as peripherals. Timing circuitry employs system clock and superframe reference to generate:

1. Timeslot and frame counting and an internal 2.048 MHz clock; also, module timeslot boundaries, synchronized with the X-Point and transceiver timeslots.
2. Bus-timed outbound strobes once per timeslot per interface. These precede module timeslot boundaries by several bus-timeslots.
3. Bus-timed inbound strobes once per timeslot per interface. These follow module timeslot boundaries by several bus-timeslots. These enable latched tri-state bus drivers on the status bus 114 and the inbound data bus 104, properly timed so that, in FIG. 1, the interface controller 110 and the Switching Network 102, respectively, will receive these signals.

The delays between the outbound strobing, the module timeslot boundaries, and the inbound strobing permit both interfaces to be logically identical; only the bus-timed strobing is different and then only by one bus-timeslot.

Control Processor 108 includes a data base in its associated memory in which the desired operational properties of all of the subchannels and of all of the interfaces is stored. Such a Control Processor 108 may be a TRN9154B Control Processor available from Motorola, Inc. Control Processor 108, through its Interface Controller 110, communicates with the Interface Modules 121-128 via a pair of 4.096 Mbps signal busses: the control bus 112 communicates toward the interfaces to control them and the Status bus 114 provides a return communications path on which the interfaces reply and report changes in status. Control bus-timeslot assignments coincide with Outbound Data bus-timeslots. Status similarly coincides with Inbound Data. Each message in either direction is 32 bytes long, and is transmitted one bit per timeslot (32 bits per frame), a different set of bits in each of eight selected frames during a superframe, and is reiterated until receipt is acknowledged by the receiving end. By these paths and a simple protocol, the Control Processor 108 imposes comprehensive control of the operation of the individual interfaces and the interfaces can report all abnormal operational events as well as reply to specific requests for status and request initialization or reinitialization.

Considering now the operation of a PCM interface module such as that shown in FIG. 2, a serial PCM bit stream is input to one of the RX PCM inputs of transceiver A 222. Transceiver 222 receives RX PCM and converts the inbound bitstream to conventional Mitel ST-Bus 2.048 Mbps bitstreams, separating the inbound speech on line 230 from the inbound line signals and transceiver status on line 232.

From transceiver 222, the inbound speech on line 230 enters X-Point 228, and in normal operation emerges as a bitstream on line 234. For T1/ESF, the 24 subchannels appear on line 234 in timeslots 0-15 and 16-24, in succession, and for CEPT in timeslots 0-14 and 16-30. The bitstream on 234 enters a serial-to-parallel converter 236, which presents, one timeslot later (i.e., 1-15 and 17-25) 8-bit wide speech bytes to translator ROM 238, as 8 of 12 address bits, the other 4 bits being provided by the translator control on line 244. ROM 238 is programmed to contain as many as 16 different 8-bit translations, such as $\mu$-Law to A-Law, A-Law to $\mu$-Law, with or without selected level shifts, bit inversions, ADI or unchanged. The 8-bit parallel output gets latched into latch 246 on a module timeslot boundary; the latch 246 feeds multiplexer 248 which selects speech during all timeslots except 0 and 16, when the signal on line 264 is selected. A bus-timed strobe on line 203 gates a tristate bus driver that feeds this data onto inbound data bus 104 toward the switching network.

Transceiver A 222 sends the inbound line signals and transceiver status bitstream on line 232 to X-Point 226, and to a 4-bit delay shift register 250 which feeds a delayed stream on line 252 to X-Point 226. Different models of transceivers format the line signals and status of the signals on line 232 differently. These differences are accommodated by the program instructions of microprocessor 200. Status handling is described above, in the discussion of status bus 114.

For the T1/ESF compatible transceivers (MT8760), the 24 sets of inbound line signals appear on line 232 reiteratively as bits 1–4 of every three out of four timeslots, 0, 1, 2, 4, 5, 6, 8, . . . The microprocessor 200 sets up the X-Point 226 to route inputs 232 and 252 to outputs 254 and 256 as follows. Timeslots 0–14 of the bitstream on line 254 contain the line signals of subchannels 1–15 as received on line 232. Timeslots 0–8 of the bitstream on line 256 contain the line signals of subchannels 16–24 as received on line 252, therefore shifted to positions 5–8. Multiplexer 258 selects the first four bits of a timeslot from line 254 and the second four from 4bit delayed line 256, thus double packing the line signals of subchannels 1 and 16 during timeslot 0, 2 and 17 during timeslot 1, and so forth, feeding serial-to-parallel converter 260 which forms these pairs of 4-bit line signals into parallel words. One timeslot later latch 262 captures only one such pair each frame, that of timeslot 1 during frame 1, timeslot 2 during frame 2, and so forth through frame 15. During timeslot 16 of each frame, multiplexer 248 merges these line signals on 264 into the inbound data bus 104 toward the switching network.

For the CEPT compatible transceivers (MH89780), the line signals are already double packed per the switching network's requirements, but the hardware described above remains identical. X-Point 226 routes the line signals on line 232 to timeslots 0–14 of both lines 254 and 256, so the line signals emerge in latch 262 during timeslots 1–15, to be available during timeslot 16 in correct order, multiplexed by multiplexer 248 into inbound data on bus 104.

Timeslot 0 of the outbound bus 106 is provided by the Switching Network 102 and timeslot 0 of inbound bus 104 is provided by X-Point 226 (because of the slot delay, in its timeslot 31), and is initialized by the microprocessor 200.

The microprocessor 200 preestablishes the X-Point path in X-Point 224 from line 270 to line 268 as an identity in all 32 time slots to provide refresh. (Interface Transceiver "B" 221 of FIG. 2, being logically connected the same as interface Transceiver A, 222 works in similar fashion). In each bus timeslot, one bit of the control line 112 is latched into latch 217 by a bus-timed strobe line 212 and then transferred into latch 219 on an occurrence of a module timeslot boundary (shown in FIG. 3). During eight selected frames of each superframe this bit is then merged into refreshing the reiterative bitstream on line 268 at a frame-dependent bit position within the current timeslot by a multiplexer 266 (which may be a conventional 74LS157 or equivalent) to form an updated reiterative bitstream on line 270, which is the current control message in serial form. The microprocessor 200 has access to all thirty-two bytes of a control message, one at a time, by periodically interrogating the X-Point 224. It uses this information to establish operational parameters, including:

1. Formatting the reiterative bitstream on line 272 in transceiver compatible form, and
2. Formatting the reiterative timeslots of the bitstream on outbound line 296, such as frame alignment and non-frame alignment information, and
3. Formatting the reiterative bitstream on line 240 which is used for translation instructions for individual subchannels, and
4. Performing specific tests and diagnostics; and
5. Reporting selected abnormalities in operation.

The microprocessor 200 monitors transceiver A 222 status information of the reiterative bitstream on the inbound signals and status line 232 by periodically interrogating its salient timeslots in X-Point 226. Changes in status reported by the transceiver A 222 as well as other abnormalities and acknowledgments of control messages are formatted into thirty-two byte messages which the microprocessor 200 writes into X-Point 224, so that the entire message is reiterated every frame on the bitstream of line 225. Each timeslot of eight selected frames of a superframe, a frame-dependent bit of this message is captured by latch 227, and then transferred at a module timeslot boundary to latch 229, from whence it is strobed by the bus-timed strobe line 202 onto status bus 114. Thus the entire status message is reiterated on bus 114 once every superframe.

The reiterative bitsream on line 240 feeds through serial-to-parallel converter 242 to latch 241, which provides up to eight bits on line 244, four each for inbound translator 238 and outbound translator 276.

Outbound data (speech and line signals) on the bus 106 is strobed each timeslot into latch 220 by the bus-timed signal on line 213. Each speech byte thus latched feeds conventional translator ROM 276, which translation is determined by the four bits of line 244. The ROM is programmed to contain as many as 16 different 8-bit translations, such as μ-Law to A-Law, A-Law to μ-Law, with or without selected level shifts, bit inversions, ADI (Alternate Digit Inversion), or unchanged. The output of ROM 276 feeds parallel-to-serial converter 278 which in turn provides a continuous speech bitstream to X-Point 228. The microprocessor 200 sets up the paths in X-Point 228 to the speech bitstream on outbound speech line 280. For CEPT this is identity, but for DS-1/ESF the timeslots are shifted to meet the transceiver (MH89760) device requirements.

Outbound line signals, 4-bits per subchannel, two subchannels per frame, are packed into timeslot 16 of the outbound data bus 106. During timeslot 16 of each frame, latch 273 captures the contents of 8-bit latch 220, which is then made available to conventional ring shift register 274 at the end of timeslot 31. During each timeslot of each frame, ring shift register 274 is clocked around on itself so that output on line 282 is bit-for-bit aligned with the X-Point 226 timeslots and the output on line 290, half around the ring, appears aligned to a X-Point 226 timeslot as "nibble-swapped". In only the timeslots used by the particular transceiver model for line signals, the microprocessor 200 sets up X-Point 226 for identity from the output of multiplexer 284 (which may be a 74LS157) to refreshing the reiterative bitstream on line 286 and from the output of multiplexer 292 (which also may be a 74LS157) to refreshing the reiterative bitstream on line 288. The microprocessor 200 writes reiterative instructions for the transceiver in other timeslots, such as frame alignment words and transceiver control commands.

Multiplexers 284 and 292 merge line 282 and line 290 with the refreshing bitstreams on lines 286 and 288, respectively, to accomplish updating during one timeslot of a frame. The selected sequence of timeslots is frame-dependent and transceiver model-dependent, and is such as to merge the line signals on lines 282 and 290 for their respective subchannels into the exact timeslots required by the particular transceiver model. Multiplexer 294 selects appropriately from the straight-through line signals of line 286 and the nibble-swapped line signals on line 288 to construct the outbound line signal stream on line 296 to the transceiver A 222. The differences in T1/ESF and CEPT timing are accommodated by differences in programmable array logic in the timing circuitry. The transceiver A 222 thus is provided with the control, line signals and speech bitstreams to be able to transmit TX PCM.

For a specific example of the conversion of a single subchannel of one format to another format, reference to FIG. 3 provides a representation of the performance of the present invention. A PCM data stream in the DS-1 format (using U-Law) is input to the transceiver 222 of PCM interface module 121. An 8-bit serial data word 301 is converted, as described above, to an 8-bit parallel byte A-Law word 303 and transferred on inbound data bus 104 to the switching network 102. Since the connection has presumably already been established in the exchange between the input data timeslot and the outbound data timeslot, the switching network 102 places the 8-bit parallel byte 303 on the outbound data bus 106 at the appropriate time. A PCM interface module, for example module 122 having an interface to CEPT format data stream, accepts the 8-bit parallel byte 303 on the outbound data but 106. The 8-bit parallel byte 303 is converted to 8-bit serial data word 305, as described previously and inserted into a subchannel timeslot of CEPT-format data stream. This CEPT format data stream is subsequently output from PCM interface module 122.

Considering now control messages, one category of control message transmitted to an interface is a subchannel parameter message; it establishes all of the unique parameters of a specified subchannel, including all the information required of the transceiver, the translation control information, whether it should be looped back, and if so the disposition of the PCM connection toward the distant office. During initialization the interface will receive one such message for each subchannel. Any of these may be updated at any time.

The translation information provided bY a subchannel parameter message is used by the microprocessor 200 to write the required translations as the first eight bits of the timeslot, one timeslot early (i.e., for subchannel 1 in timeslot 0, etc.), in the reiterative bitstream on line 240 in X-Point 224.

Another category of control message transmitted to an interface is the group service message, used to remove the entire PCM group from service, or to attempt to restore it to service. This message permits a number of options on the information presented toward the switching network, including each of the following, always while sending the appropriate alarm condition toward the distant end:

1. On-hook quiet line, as provided by the transceiver 222 when it is removed from service, as when it alarms due to defects in the RX PCM.
2. Looped back outbound data and line signals from bus 106 to inbound bus 104, subject to current translations, achieved by path connection manipulation in X-Points 226 and 228.
3. Looped back outbound data and line signals from bus 106 to inbound bus 104, subject to current translations, achieved by execution in the transceiver A 222.
4. Looped back outbound data and line signals from bus 106 to inbound bus 104, subject to unchanged translations. This is achieved by path connection manipulation in X-Points 226 and 228, and manipulation of the reiterative translation bitstream on line 240 by X-Point 224. When normal service is restored, the previous translations will be restored. If the interface is placed in service while the transceiver is in alarm due to defects in RX PCM, as soon as the alarm condition is removed in the transceiver, the interface resumes normal operation.

In an alternative embodiment, the transceivers 221 and 222 of FIG. 2 may be replaced by a single transceiver that operates in DS-1C protocol at about 3.154 Mbps, appropriately interleaving the speech/data and line signals of two DS-1/ESF circuits. In a further version of this alternative embodiment, the transceivers 221 and 222 of FIG. 2 may be replaced by a single transceiver that operates at 4.096 Mbps, combining the speech/data and line signals of two CEPT circuits.

Returning to FIG. 1, Control Processor 108 incorporates one or more RS-232 communications ports used at least in part for updating or otherwise changing, either temporarily or permanently, the data base which establishes the operational parameters of the interfaces and their subchannels. When the exchange is employed in Digital Access and Cross Connect Systems (DACCS) service, the protocol permits each end user to modify the parameters associated with his particular circuits, including changing the paths and changing the translations of the various subchannels.

In summary, then, a PCM telephone/data switch that is simultaneously compatible with both DS-1 and CEPT PCM formats has been shown and described. A switch module performs timeslot switching of individual channels between DS-1 and CEPT trunks which are input by way of digital group interfaces. Each group interface interfaces with one or more trunks of serial bit streams of either DS-1 or CEPT format standards. After the input serial bit stream is converted to a parallel format, it is used as eight bits of the address bits of data processing ROMs from which a corresponding 8-bit word is parallel read on a per channel basis and routed to the appropriate output data processing ROMs. The output data bits of these ROMs are the processed data bits which are then reconverted to serial format for either DS-1 or CEPT standards as required by the output trunk. A-law or $\mu$-law decoding and encoding is accomplished independently from input to output channel on a per channel basis as necessary. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

We claim:

1. A digital telephone switch which has simultaneous dual pulse code modulated (PCM) format capability, comprising:

first means, coupled to a first trunk of a plurality of communication subchannels in a first serial data bit stream of a PCM format having A DS-1 frame structure and data rate, for converting one of said plurality of communication subchannels in said first serial data bit stream to a parallel data byte;

second means, coupled to a second trunk of a plurality of communication subchannels in a second serial data bit stream of a PCM format having a CEPT-30 frame structure and data rate, for converting said parallel data byte to one of said plurality of communication subchannels in said second serial data bit stream; and means for switchably coupling said parallel data byte from said first means for converting to said second means for converting.

2. A digital telephone switch in accordance with claim 1 wherein said parallel data byte further comprises an 8-bit parallel byte.

3. A method of serving at least two simultaneous serial data streams of pulse code modulated (PCM) format on a subchannel by subchannel basis in a digital telephone switch, comprising the steps of:

converting one of a first plurality of communication subchannels in a serial data bit stream of a DS-1 frame structure and data rate on a first PCM trunk to a parallel data byte on a first bus;

switchably coupling said parallel data byte from said first bus to a second bus;

converting said parallel data byte on said second bus to a serial data bit stream of CEPT-30 frame structure and data rate in one of a second plurality of communication subchannels; and coupling said second plurality of communication subchannels to a second PCM trunk.

4. A digital telephone switch in accordance with claim 1 further comprising means for controlling said first and second means for converting by way of a first control line and a second control line.

5. A digital telephone switch which has simultaneous dual pulse code modulated (PCM) format capability, comprising:

first means, coupled to a first trunk of a plurality of communication subchannels in a first serial data bit stream of a PCM format having a first frame structure and data rate, for converting one of said plurality of communication subchannels in said first serial data bit stream to a parallel data byte;

means for translating said parallel data byte in accordance with a first predetermined translation procedure, thereby creating a translated parallel data byte;

means for retranslating said translated parallel data byte in accordance with a second predetermined translation procedure, thereby creating a retranslated parallel data byte; and second means, coupled to a second trunk of a plurality of communication subchannels in a second serial data bit stream of a PCM format having a second frame structure and date rate, for converting said retranslated parallel data byte to one of said plurality of communication subchannels in said second serial data bit stream.

6. A digital telephone switch in accordance with claim 5 wherein said means for translating further comprises means for translating from A-law to $\mu$-law.

7. A digital telephone switch in accordance with claim 5 wherein said means for translating further comprises means for translating from $\mu$-law to A-law.

8. A digital telephone switch which has simultaneous dual pulse code modulated (PCM) format capability, each PCM format having a plurality of communication subchannels with message bits and associated line signal bits in a serial data bit stream, the digital telephone switch comprising:

first means, coupled to a first trunk of a plurality of communication subchannels in a first serial data bit stream of a PCM format having a first frame structure and data rate, for converting the message bits of one of said plurality of communication subchannels in said first serial data bit stream to a parallel data byte;

second means, switchably coupled to said first means for converting, for converting said parallel data byte to one of said plurality of communication subchannels in a second serial data bit stream of a PCM format having a second frame structure and data rate, said second means for converting being coupled to a second trunk of a plurality of communication subchannels having said second serial data bit stream; and means for controlling the routing of the message bits of one of said plurality of communication subchannels in said first serial data bit stream and an associated line signal bit without storing said parallel data byte for conversion from said first frame structure to said second frame structure.

* * * * *